United States Patent
Myers et al.

(10) Patent No.: US 7,685,295 B2
(45) Date of Patent: Mar. 23, 2010

(54) WIRELESS LOCAL AREA COMMUNICATION NETWORK SYSTEM AND METHOD

(75) Inventors: Robert L. Myers, Mississauga (CA); Michael P. Montemurro, Toronto (CA); Mark D. Oliver, Georgetown (CA); Paulo Neves Francisco, Mississauga (CA)

(73) Assignee: Chantry Networks Inc., Mississauga, Ontario (CA)

( * ) Notice: Subject to any disclaimer, the term of this patent is extended or adjusted under 35 U.S.C. 154(b) by 1330 days.

(21) Appl. No.: 10/322,463

(22) Filed: Dec. 19, 2002

(65) Prior Publication Data

US 2004/0122956 A1     Jun. 24, 2004

(51) Int. Cl.
*G06F 15/16* (2006.01)
(52) U.S. Cl. .................. 709/228; 709/220; 709/227; 709/249; 455/403; 455/426.1; 455/428; 370/356; 370/401
(58) Field of Classification Search .................. 709/249, 709/220, 227, 228; 370/356, 401, 397
See application file for complete search history.

(56) References Cited

U.S. PATENT DOCUMENTS

| | | | |
|---|---|---|---|
| 5,828,663 A | 10/1998 | Ikegami | |
| 6,002,679 A | 12/1999 | Liu et al. | |
| 6,016,318 A | 1/2000 | Tomoike | |
| 6,112,085 A * | 8/2000 | Garner et al. | 455/428 |
| 6,272,129 B1 | 8/2001 | Dynarski et al. | |
| 6,477,156 B1 * | 11/2002 | Ala-Laurila et al. | 370/331 |
| 2001/0055283 A1 | 12/2001 | Beach | |
| 2002/0022491 A1 | 2/2002 | McCann et al. | |
| 2002/0059434 A1 | 5/2002 | Karaoguz et al. | |
| 2002/0072382 A1 | 6/2002 | Fong et al. | |
| 2002/0085719 A1 | 7/2002 | Crosbie | |
| 2003/0071126 A1 * | 4/2003 | Waxelbaum | 235/462.25 |
| 2003/0112820 A1 * | 6/2003 | Beach | 370/465 |
| 2004/0116120 A1 * | 6/2004 | Gallagher et al. | 455/436 |

OTHER PUBLICATIONS

Virtual Cell in Mobile Computer Communication by Yann-Hang Lee, Technical Report TR94-020, Computer & Information Science Department, University of Florida, Mar. 1996.*

* cited by examiner

*Primary Examiner*—Nathan Flynn
*Assistant Examiner*—Mohammad A Siddiqi

(57) ABSTRACT

A wireless network for supporting mobile unit traffic segmentation for a plurality of mobile units to associate each mobile unit with virtual networking services (VNS). The wireless network includes a plurality of radio units and access controllers. Each radio unit is adapted to initiate the connection of a mobile unit to the network by transmitting and receiving communication data to and from the mobile unit. Each access controller is adapted to receive communication data from each radio unit during the connection of a mobile unit. Based on the communication data transmitted to the radio unit during connection of the mobile unit, access controller is able to discover VNS factors for the mobile unit communication session and to establish a communication session based on the VNS factors discovered during the connection process such that the mobile unit is connected to the network on the basis of the characteristics defined by the virtual networking services.

25 Claims, 16 Drawing Sheets

150

| 0 | | | 32 |
|---|---|---|---|
| Version | TYPE | SEQUENCE # | FLAGS |
| SESSION ID | | Length | |

| 0 | | | 32 |
|---|---|---|---|
| Version | TYPE | SEQUENCE # | FLAGS |
| SESSION ID | | Length | |
| TYPE | QOS | SSID | |
| MU MAC ADDRESS | | | |
| MU MAC ADDRESS | | RESERVED | |

FIG. 4B

|  | $t_1$ Associate | $t_2$ 802.1x start | $t_3$ 802.1x reply | $t_4$ Redirection | $t_5$ Re-Associate |
|---|---|---|---|---|---|
| SSID | X | | | | |
| Radio Unit | X | | | | X |
| Mobile Unit | X | | | | |
| Security Mechanism | | X | | | |
| USER ID | | | X | X | |

FIG. 7B

|  | $t_1$ Associate | $T_2$ 802.1x start | $t_3$ 802.1x reply | $t_4$ Redirection | $t_5$ Re-Associate |
|---|---|---|---|---|---|
| Authentication Mechanism | X | X | | | |
| Accounting Mechanism | X | X | X | X | X |
| IP Address Pools | X | X | X | | |
| Egress Interface or Virtual Router | X | X | X | | |
| Quality of Service | X | X | X | X | X |
| Packet Filters | X | X | X | X | X |
| Walled Garden | X | X | X | X | |

FIG. 9

WIRELESS LOCAL AREA COMMUNICATION NETWORK SYSTEM AND METHOD

FIELD OF THE INVENTION

This invention relates to a wireless communication network and more particularly to a wireless communication system and method for segmenting mobile units and mobile unit traffic.

BACKGROUND OF THE INVENTION

Virtual networking services (VNS) is a network service provided on a managed IP network that provides for the definition of several virtual wireless LAN networks within a single physical wireless LAN network. By grouping mobile units together using a VNS and controlling their sessions centrally, specific policies can be applied to such groups of users such as which security mechanism is applied, what grade of service is to be provided, or even what network their traffic is associated with (e.g. intranet, Internet etc.) Existing strategies for the deployment of virtual wireless local area networks fail to provide flexible and customizable network connection services to mobile users within a wireless LAN.

One current strategy for segmenting mobile units involves the use of highly intelligent access points that adds functionality directly to the access point to increase its capability to perform higher layer policy services. Such commercially available access points have generally been designed as an extension of a single Ethernet port. That is, data that arrives on the wireless interface is forwarded out to the Ethernet LAN with no mechanisms to segment user traffic. This has been done for practical reasons. In order for access points to support user traffic segmentation, every access point would have to support multiple interfaces (one for each network). This approach would be unmanageable and costly as the network grew in number of access points and networks.

Another strategy is to use an overlay controller to insert a device in the network to act as a policy engine between the network and the mobile devices that connect to an access point. Although an overlay controller centralizes the networking and access components of a wireless LAN, an overlay controller does not have direct ties to the capabilities of the access point and hence relies on higher level connections to determine the state of a mobile unit. In other words, these overlay controllers are not involved in the wireless connection process and do not have access to decision points that occur during the connection process. This limits their ability to be able to effect flexible segmentation functionality. Also, these controllers cannot provide segmentation to individual users at the access point level, and hence cannot provide the flexibility of offering secure traffic segmentation to different mobile units on the same access point.

Further, U.S. Patent Application No. 2001/0055283 to Beach discloses a method for creating separate virtual wireless local area networks on the same physical wireless local area network. This reference discloses a method to configure the access points with a number of different ESS identifiers, one ESS identifier for each virtual wireless LAN. Mobile units are therefore segmented on the wireless LAN based on what ESS identifier they are using to access the access point of the wireless local network. This method, is limited to providing user segmentation on the basis of the ESS identifier only and cannot provide meaningful discrimination amongst mobile units. Also, a specific mobile user's segmentation cannot be altered over time and the parameters of the segmentation must be determined in advance of the mobile unit's connection to the wireless LAN.

SUMMARY OF THE INVENTION

The invention provides in one aspect, a wireless network for supporting mobile unit segmentation for a plurality of mobile units in order to associate each mobile unit with virtual networking services (VNS), said network comprising:
 (a) a first radio unit for initiating the connection of the mobile unit to the network by transmitting and receiving communication data to and from the mobile unit; and
 (b) an access controller coupled to said radio unit and being adapted to:
  (i) receive said communication data from said radio unit during the connection of each mobile unit;
  (ii) determine a plurality of VNS factors for the mobile unit communication session based on said communication data;
  (iii) associate the mobile unit with virtual networking services based on said VNS factors; and
  (iv) establish a mobile unit communication session based on the VNS factors discovered during the connection process such that the mobile unit communication session has the network characteristics defined by the assigned virtual networking services.

In another aspect, the present invention provides a method for performing mobile unit traffic segmentation in respect of a plurality of mobile units within a wireless network in order to associate each mobile unit with virtual networking services (VNS), said network including an access controller and a first radio unit, said method comprising the steps of:
 (a) initiating the connection of a mobile unit to the network by transmitting communication data between the mobile unit and the first radio unit;
 (b) transmitting said communication data from said first radio unit to said access controller;
 (c) discovering a plurality of VNS factors for the mobile unit communication session based on said communication data;
 (d) associating the mobile unit with virtual networking services based on said VNS factors; and
 (e) completing the connection of a mobile unit to the network on the basis of the characteristics defined by the assigned virtual networking services.

Further aspects and advantages of the invention will appear from the following description taken together with the accompanying drawings.

BRIEF DESCRIPTION OF THE DRAWINGS

In the accompanying drawings.

FIG. 4A is a schematic drawing illustration of the radio unit header used for communication between the radio unit and access controller of FIG. 1;

FIG. 4B is a schematic drawing illustration of the mobile unit data header used for encapsulated communication between the radio unit and access controller of FIG. 1;

FIG. 7B is a table illustrating the VNS factors discovered in each time segment during the connection process of a mobile unit to the wireless LAN;

FIG. 9 is a table showing which VNS parameters can be determined in which time segment based upon the VNS factors learned within each of those segments.

DETAILED DESCRIPTION OF THE INVENTION

Figure 1A:
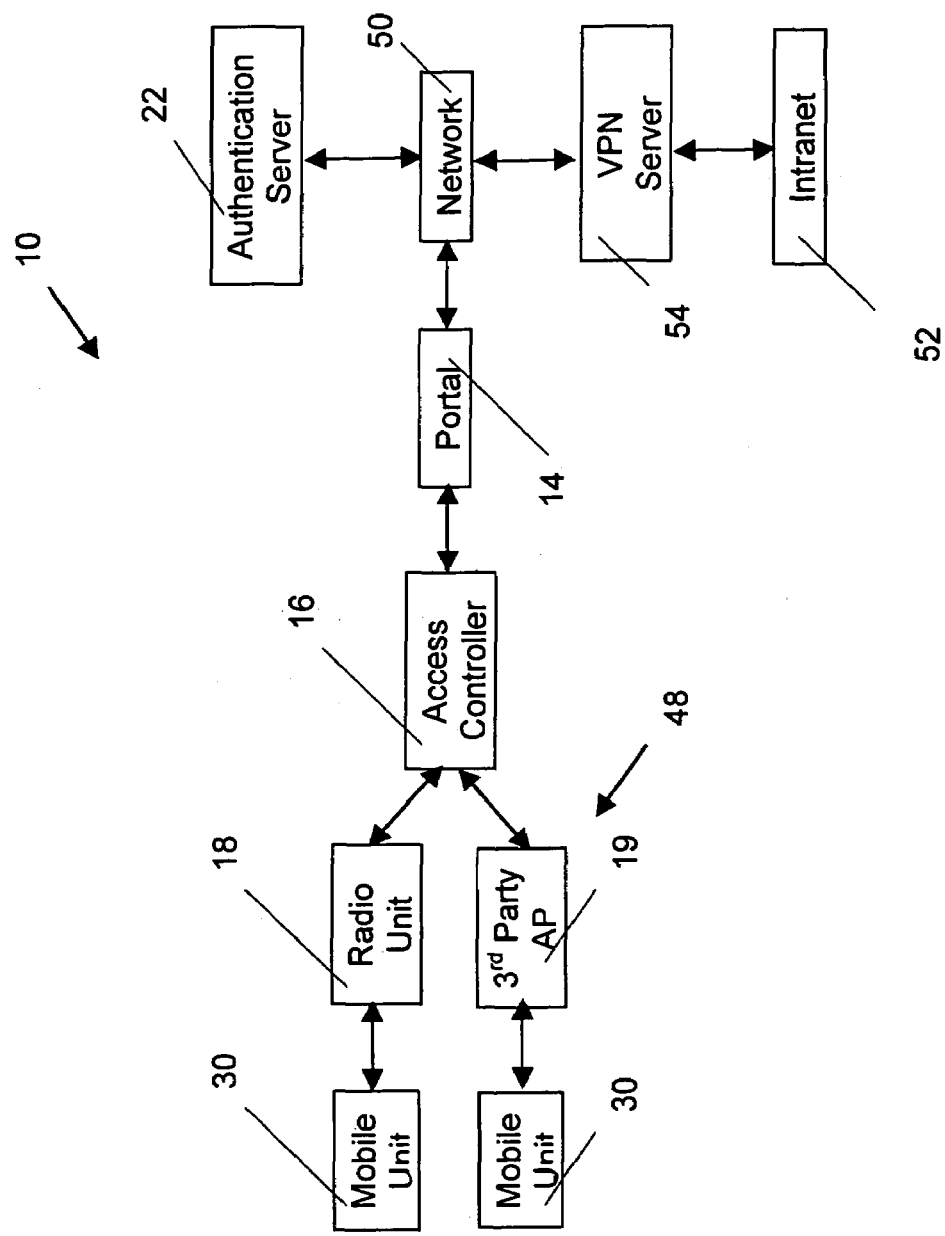
FIG. 1A is a schematic diagram of an example of a high level implementation of the wireless local area network (LAN) of the present invention.

FIG. 1A illustrates the main components of a wireless network 10 operating in accordance with a preferred embodiment of the invention. Wireless network 10 includes, a plurality of access controllers 16, a plurality of radio units 18 and third party access points 19, mobile units 30, and a back-end network (e.g. intranet) 50. Using the communication protocol of the present invention, wireless network 10 provides mobile unit traffic segmentation for a plurality of mobile units 30 for the purpose of assigning virtual networking services (VNS).

Mobile unit 30 is any electronic device that will support wireless communication with the radio unit 18 such as the IEEE 802.11 standard, Bluetooth standard or any other wireless protocol for wireless communication. Mobile unit 30 could be a laptop, personal digital assistant (PDA) or other device capable of wireless communication.

Figure 2A:
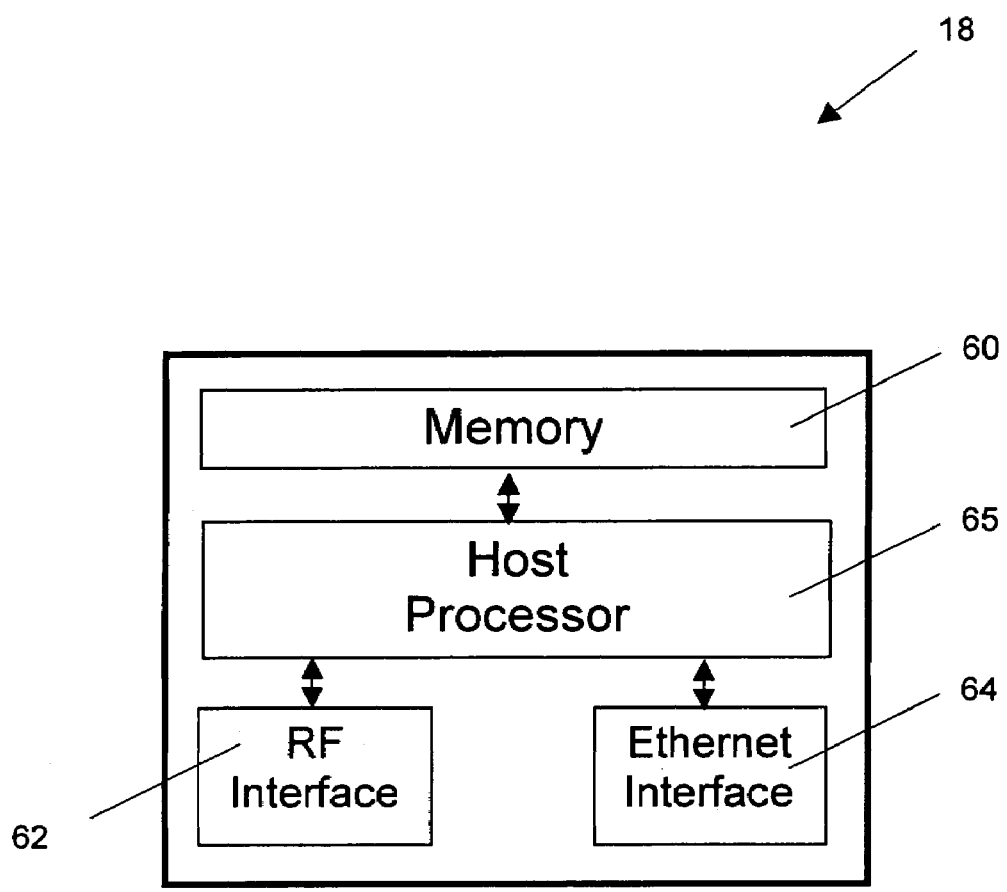
FIG. 2A is a block diagram illustrating the hardware components of the radio unit of FIG. 1.

Radio unit 18 acts as the connection point for the mobile unit 30 to the wireless network 10. As shown in FIG. 2A, radio unit 18 includes an RF interface 62 (i.e. receiver) capable of receiving RF signals from mobile unit 30. RF receiver 62 is capable of receiving signals from the mobile unit 30 in accordance with a wireless standard such as the IEEE 802.11 standard, Bluetooth standard or other wireless communication standard. Radio unit 18 also includes a memory 60, a host processor 65 as well as an Ethernet interface 64. Several radio units 18 can be connected through a backbone, which can be any suitable network technology, such as an Ethernet LAN. It should be understood that wireless network 10 is also able to accommodate third party access points 19 through which to receive mobile unit 30 communication data using other appropriate protocols that are dependent on the specific parameters suited to the particular software and hardware configuration of third party access points 19.

Figure 3A:
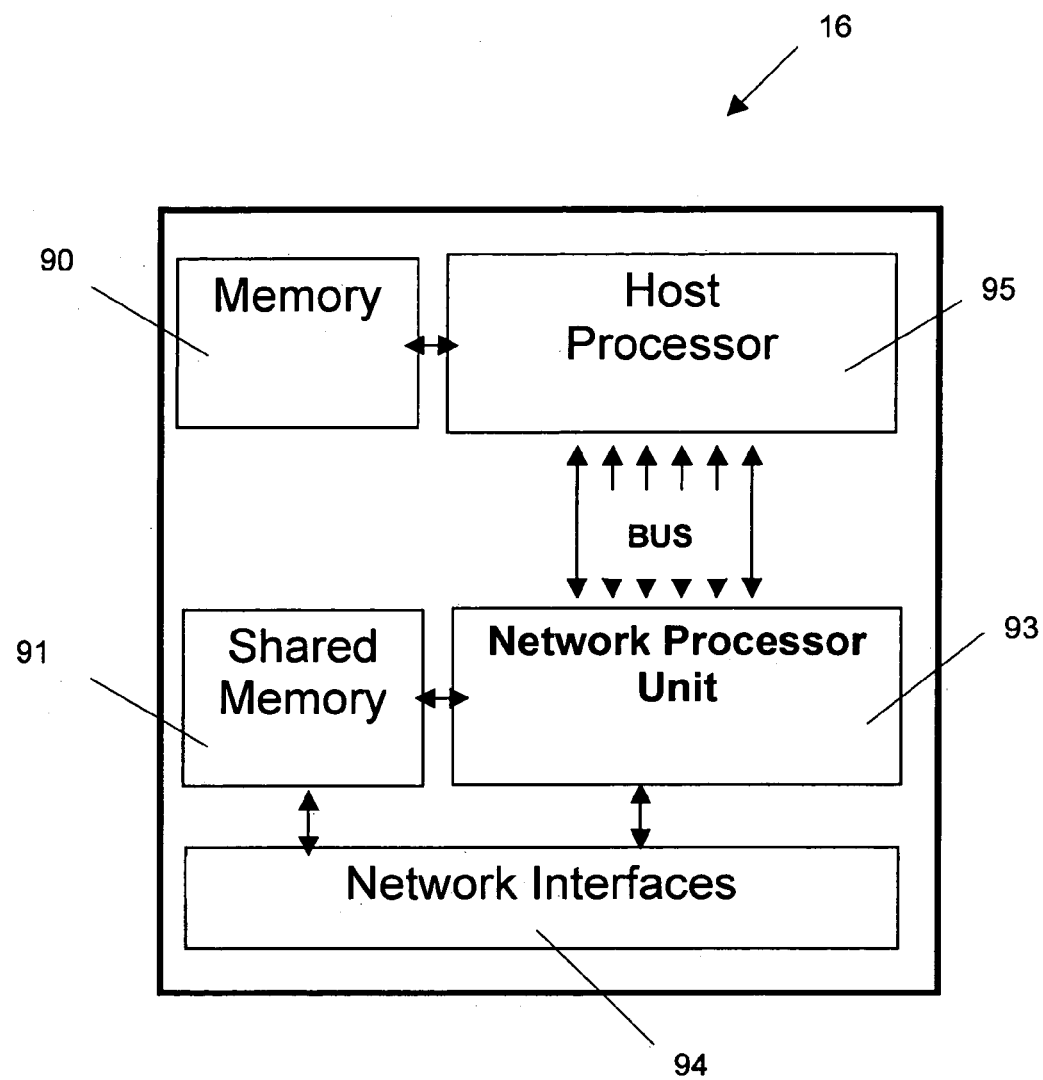
FIG. 3A is a block diagram illustrating the hardware components of the access controller of FIG. 1.

Access controller 16 is connected within wireless network 10 through a network connection such as Ethernet. Access controller 16 is in communication with the radio unit 18 by way of portal 14. As shown in FIG. 3A, access controller 16 includes a memory 90, host processor 95, shared memory 91, a plurality of network process units 93 and a plurality of network interfaces 94. Shared memory 91 is a memory disk or other data storage device (e.g. RAM) that stores mobile unit session data and radio unit session data as will be described.

Each radio unit 18 is associated with a radio unit session, and this radio unit session is stored as radio unit session data in shared memory 91. However, it should be understood that for availability purposes, the radio unit session could be stored using a RU_REGISTRY service that keeps session info in OS memory 90 on the Host Processor 95. Also, each mobile unit 30 is associated with a mobile unit session, and this mobile unit session is stored as mobile unit session data in shared memory 91. Host processor 95 is used to provide local processing of mobile unit session data and radio unit session data as will be described. Network interfaces 94 are used to provide communication functionality between access controller 16 and radio unit 18 and access controller 16 and back-end network 50. It should be understood that strong control and data path linkages are provided between access controller 16 and radio unit 18.

Conventional networks can include portals 14 which provide for communication between radio units 18, back-end network 50 and access controller 16. Portal 14 is implemented by a commercially available router such as a Cisco 3725 Multiservice Access Router (manufactured by Cisco Systems of California). It should be understood that while it is not necessary for proper operation of the invention that portal 14 be present within wireless network 10, however, the present invention is adapted to support any existing portals 14 within wireless network 10.

Back-end network 50 can be either a hard-wired network, such as Ethernet or another configuration supported by the IEEE 802 LAN standards or a wireless network. Back-end network 50 connects to authentication server 22 and to access controller 16 either directly or through communication with portal 14. Authentication server 22 may be any of a number of standard authentication servers depending on the type of protocol adopted for use between access controller 16 and authentication server 22. For example, if the Remote Authentication Dial In User Service (RADIUS) protocol is adopted for use within wireless network 10, then a Steel Belted RADIUS server (manufactured by Funk Software) would be used. As another example, the LDAP protocol could be used with an associated LDAP compatible server. Authentication server 22 is used as part of the IEEE 802.1x standard to authenticate mobile unit 30 as it attempts to connect to the wireless network 10. Authentication server 22 can also be used to authenticate a mobile unit 30 as part of a captive portal feature by capturing the mobile unit 30 information and then sending a message to the authentication server to get confirmation.

Wireless network 10 can also include a VPN router 54 to provide communication between mobile unit 30 and a customer's Intranet 52 over back-end network 50 as shown. Specifically, VPN router 54 provides a secure connection between access controller 16 and a device on the Intranet 52 by providing a logical connection (i.e. a tunnel over a public network).

Each access controller 16 is adapted to receive communication data from each radio unit 18 during connection of mobile unit 30. Based on the communication data transmitted to radio unit 18 during connection of the mobile unit 30, access controller 16 is able to discover VNS factors for the mobile unit communication session and to establish a communication session such that the mobile unit is connected to the network on the basis of the characteristics defined by virtual networking services (VNS). The communication protocol of the present invention encapsulates all packets destined or sent from each mobile unit 30, provides control messages to support management of the mobile unit 30 connection, and provides management messages to support the discovery, configuration and management of a radio unit 18.

Figure 1B:
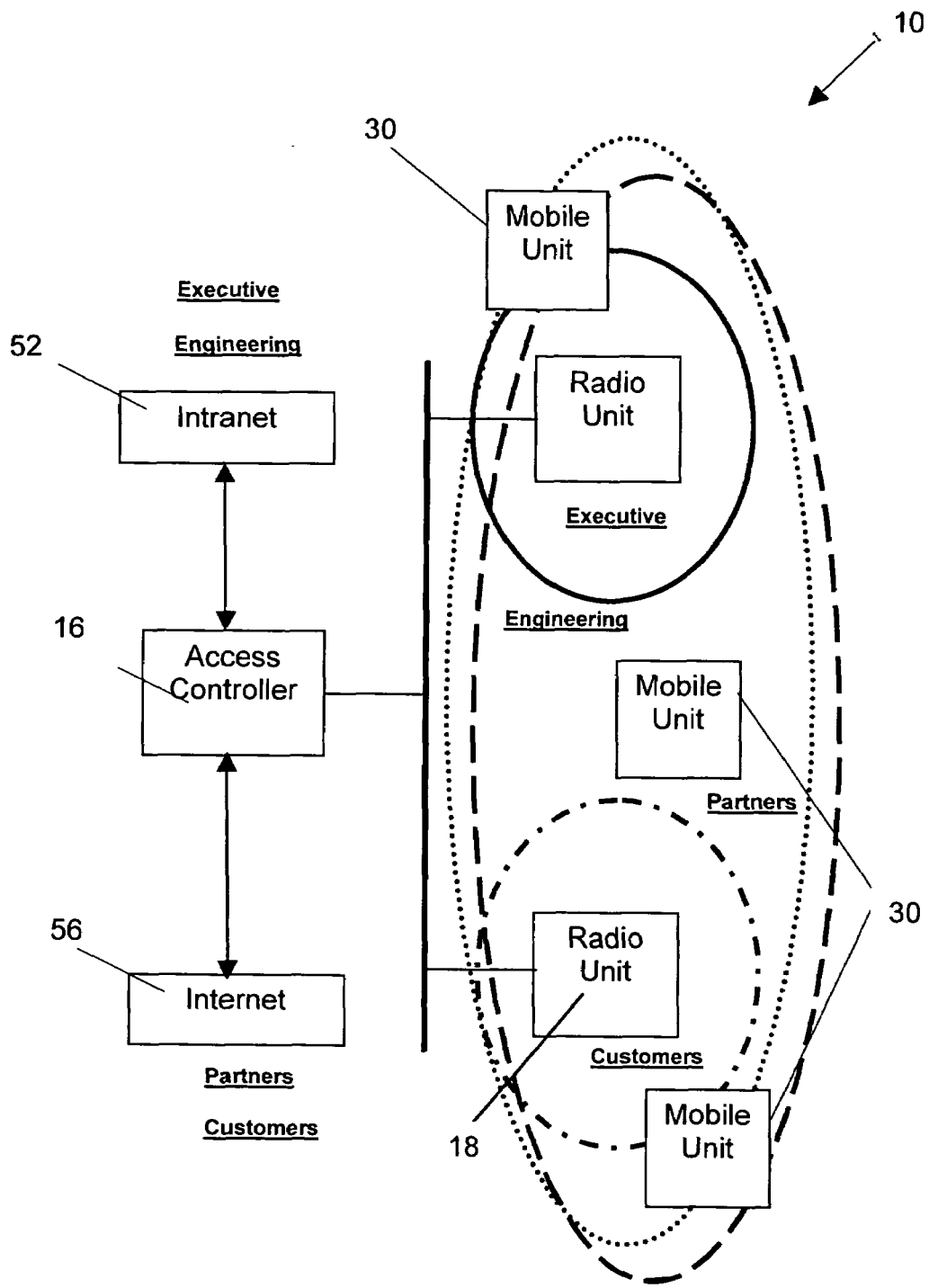
FIG. 1B is a schematic diagram illustrating the network segmentation feature of the wireless LAN of FIG. 1.

FIG. 1B illustrates how wireless network 10 implements VNS for a group of mobile units 30 associated with various types of users (e.g. engineering, executive, partners, and customers). As discussed above, VNS is a network service which allows for the definition of several "virtual access controllers" within a single physical access controller 16. By grouping mobile units 30 together to be associated with a VNS and controlling the sessions of these mobile units 30 at the access controller 16, specific policies can be applied to that group such as the applicable security mechanism, what grade of service (silver, gold, platinum) or what back-end network their traffic should be associated with. The VNS facility can also be used to define multiple security models on a single platform. VNS can provide users with connections that are secured and provisioned with Quality of Service.

The VNS network feature allows for network segmentation. Network segmentation is the ability to take traffic from a specific mobile unit 30 and ensure that it can only be forwarded out a specific interface (called the egress interface). This also ensures that when mobile unit 30 has been assigned to a VNS with network segmentation, it cannot communicate with devices on any other egress interface and when link level encryption is enabled, mobile units 30 cannot view the traffic of mobile units on another VNS as illustrated in FIG. 1B.

Egress interfaces can be defined as either a physical interface such as a 10/100baseT port or a logical interface such as a VLAN tag or a VPN tunnel. Network segmentation can be used by a network manager at an enterprise, to deploy wireless network 10 over an existing corporate LAN but still offer "Visitor Based Networking" and employee corporate access over that same infrastructure. Another example of this, is where an Internet Service Provider could offer wireless LAN ISP services in conjunction with a wholesale service to enterprises. For example, and as shown in FIG. 1B, mobile units 30 associated with customers and partners are provided with access to the Internet 56, while mobile units 30 associated with engineers and executive users are provided with access to the Intranet 52.

Further, since authentication mechanisms are controlled centrally by access controller 16, access controller 16 can assign different authentication mechanisms to mobile unit 30 based on a number of factors such as which radio unit 18 or SSID they connect to. Additionally, fallback strategies can be implemented such that if a user fails to negotiate one authentication mechanism they can fall back to another. For example, in the case where the 802.1x security protocol is the preferred mechanism to identify employee users, but a visiting third party arrives and tries to connect who does not have a client capable of 802.1x, controller 16 could recognize this and place mobile unit 30 into a VNS for visitors. This VNS for visitors could be configured as a Captive Portal as will be described in more detail.

Figure 1C:
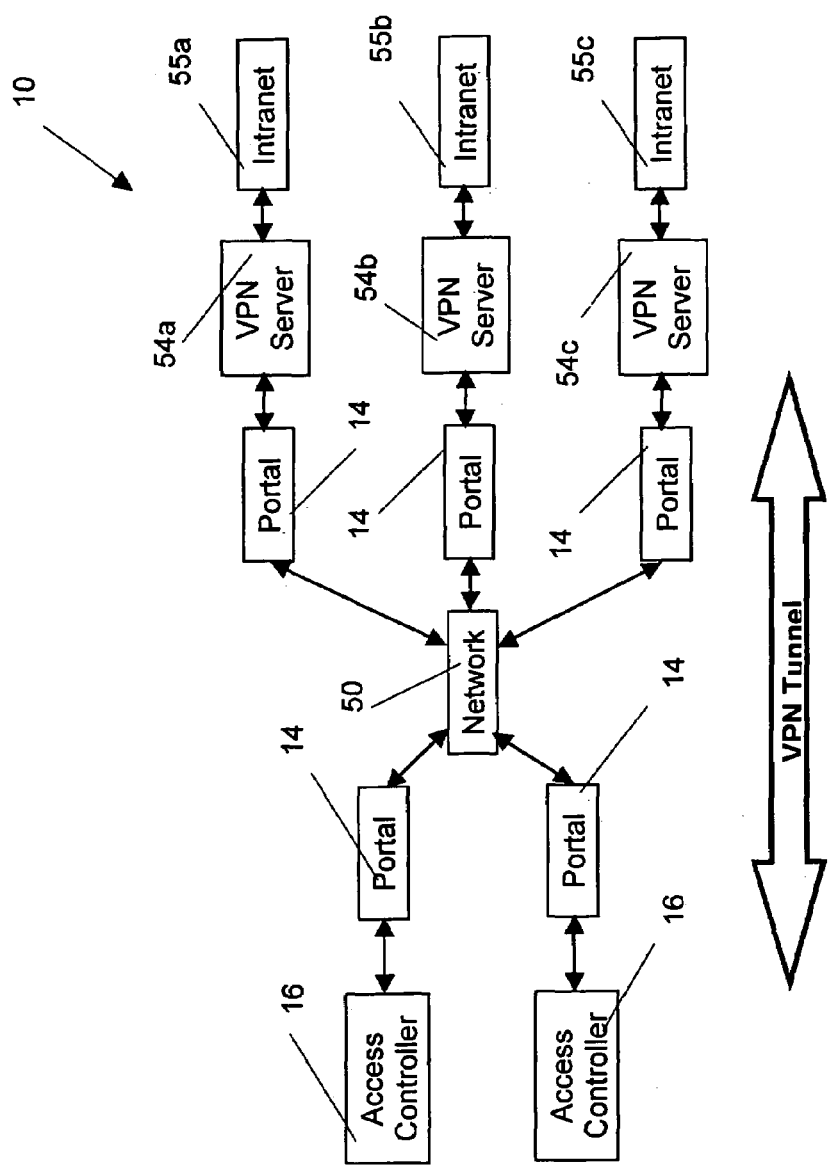
FIG. 1C is a schematic diagram illustrating the virtual private network (VPN) feature of the wireless LAN of FIG. 1.

FIG. 1C illustrates the concept of Virtual Private Networks (VPNs) branch routing. VPN's secure the physical connection between two devices by providing a logical connection or "a tunnel" over a public network. Traffic running through the tunnel is typically encrypted to provide an extra level of security. IPSec refers to a security suite of protocols designed by the IETF to provide full security services to Internet Protocol (IP) datagrams. These protocols provide standardized cryptographic security mechanisms for authentication, confidentiality, data integrity, anti-replay protection, and protection against traffic interception.

VPN branch routing is a facility to support logical egress interfaces on access server 16 that can then be leveraged by a VNS. VPN branch routing allows access controller 16 to securely connect to a VPN router 54a, 54b, or 54c associated with a particular VPN 55a, 55b, or 55c, respectively, in a remote location over an IP network as shown in FIG. 1C. Access controller 15 has multiple egress ports with links to internal virtual routers to support the forwarding and routing table updates on specific interfaces and virtual Dynamic Host Configuration Protocol (DHCP) servers. They assign IP addresses based on the network (i.e. 55a, 55b, 55c) the mobile unit 30 will communicate to and provide physical and logical support for the multiple egress interfaces.

Figure 2B:
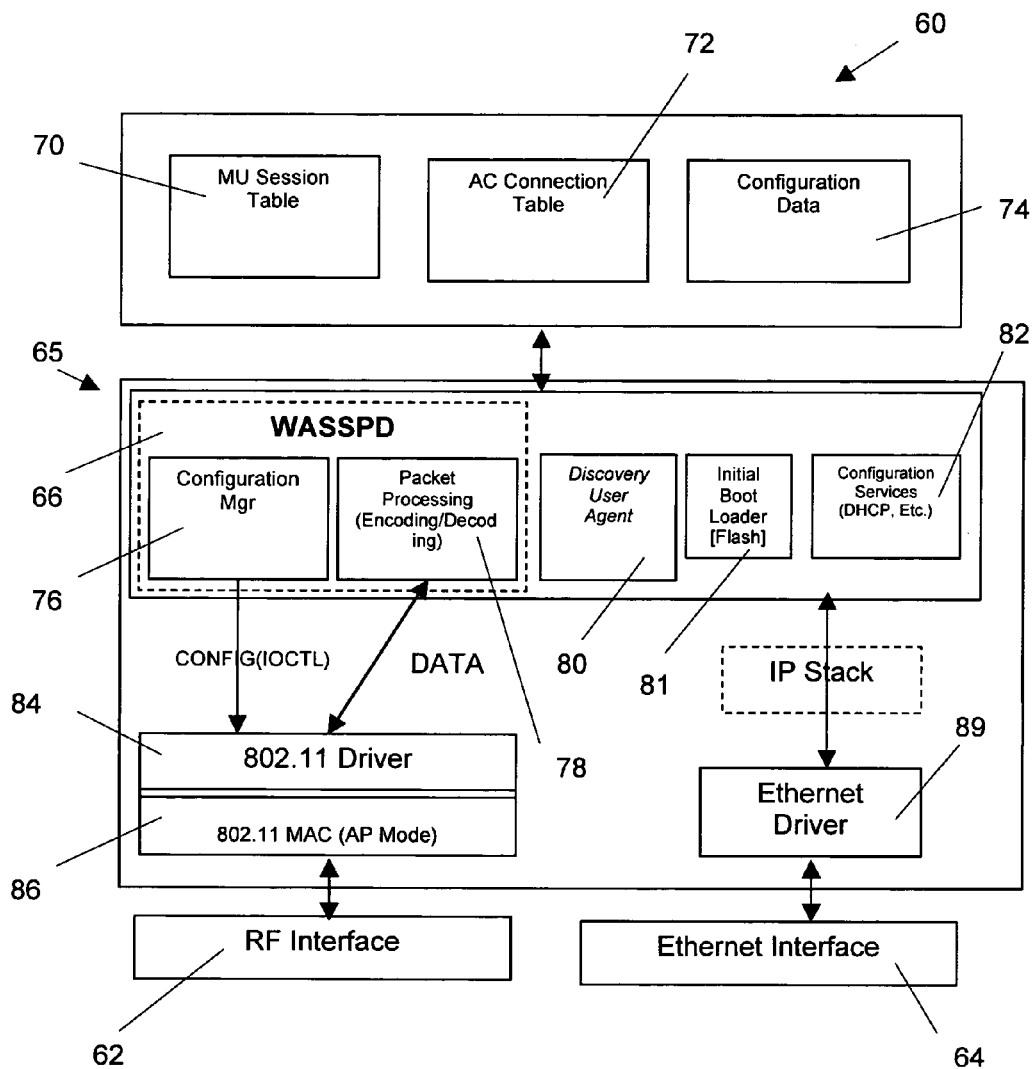
FIG. 2B is a block diagram illustrating the software components of the radio unit of FIG. 1.

FIGS. 2A and 2B illustrate the basic hardware and software components of radio unit 18. As discussed above, radio unit 18 communicates with access controller 16 and passes control information and user data. Radio unit 18 includes a memory 60, a host processor 65, an RF interface 62, and an Ethernet interface 64. Radio unit 18 is designed to be a relatively simple and low cost device that provides RF functionality and generally the same functionality as is currently available in commercially available access points. Radio unit 18 also includes various other standard access point power components including a DC-DC converter and isolation components (not shown). It should be understood that the present communication method of the invention could be implemented using any other type of radio unit 18 (i.e. with a particular hardware architecture).

Memory 60 contains mobile unit session table 70, access controller connection table 72, and configuration data table 74. Host processor 65 and memory 60 are used to implement the software functionality of radio unit 18 as illustrated in FIG. 2B. Host processor 65 provides the execution space for the configuration and control aspects for the operation of radio unit 18.

Specifically, host processor 65 includes a configuration manager 76, a packet processing module 78, a discovery user agent 80, an initial boot loader 81, a configuration services module 82, a 802.11 driver 84, a 802.11 MAC driver 86 and an Ethernet driver 89. The initial boot loader 81 provides the original software image that brings radio unit 18 into an operating mode by providing the storage for the running operating system. Initial boot loader 81 process initializes and enables the wired side of radio unit's 18 communications, which translates into the initialization of the Ethernet interface 64 and the corresponding Ethernet driver 89. Ethernet interface 64 is a conventional Ethernet interface (i.e. 10/100 Ethernet with P.O.E.) and allows radio unit 18 to be connected to existing networks with wired Ethernet.

Following boot initialization, if radio unit 18 is not statically configured with IP address parameters, radio unit 18 utilizes the functionality of the configuration services module 82 to negotiate it's network representation address (IP address), supported through its IP stack, with an applicable external network host via standard methods such as DHCP. Upon properly configuring its network access parameters (IP address) radio unit 18 then uses the functionally of the discovery user agent module 80 and the Service Discovery Protocol (SLP) to discover an appropriate area service access controller 16. Once radio unit 18 is informed of which access controller 16 it is to connect to for service provision, radio unit 18 engages in an active negotiation of authentication parameters with the access controller 16 to establish a registered session.

The registration process validates the authentication of radio unit 18 and this process is actively tracked in the active AC connection table 72 registry. Once radio unit 18 properly registers with access controller 18, radio unit 18 then engages in the validation and exchange of configuration parameters interpreted and applied by configuration manager 76 that will govern the operation of radio unit 18 and it's network representation assignments (SSID). This negotiation may indicate to radio unit 18 that a software image upgrade may be necessary in order to actively be able to provide network services to mobile units 30 within the definitions of the access controller 16 operations.

The configuration procedure primarily affects the provision of RF services. The configuration procedure is also used to specify operational parameters associated with the wireless protocol driver's and hardware module operations. Once radio unit 18 finishes this configuration process, radio unit 18 then enables RF interface 62 for operation under the specified configuration, which in turn is able to provide network services to a requesting mobile unit 16. RF interface 62 supports different RF technologies (e.g. 802.11b, 802.11a, etc.) Radio unit 18 also includes internal and optional external antennas (not shown) that are coupled to RF interface 62 as conventionally known.

The message exchanges that support registration, configuration and data transport is performed using the WASSP protocol which is implemented by WASSPd module 66. As mobile units 30 associate with radio unit 18 via the RF interface 62, radio unit 18 actively communicates with access controller 16 utilizing the WASSP protocol which is provided by WASSPd module 66 service to provide the registration of mobile unit sessions (which are stored in mobile session table 70) and to exchange any data received or to be delivered to the mobile unit 30.

Figure 3B:
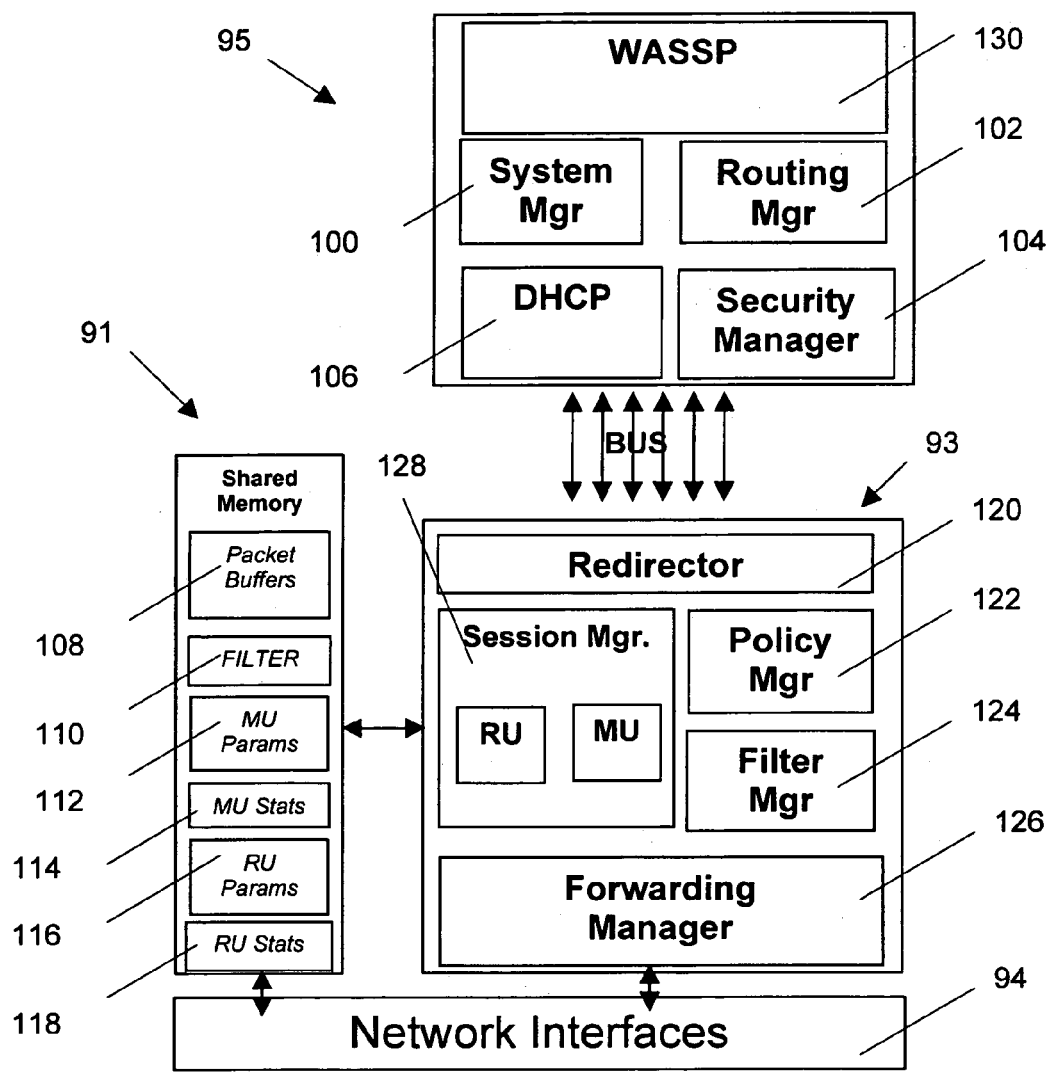
FIG. 3B is a block diagram illustrating the software components of the access controller of FIG. 1.

FIGS. 3A and 3B illustrate the hardware and software components of access controller 16. As discussed above, access controller 16 is where the higher layer packet processing and system management functions reside such as connection management, access security, policy enforcement, management and IP services (filtering, routing QOS, mobility, etc.) The software architecture described in FIG. 3B is implemented through the hardware implementation described in FIG. 3A. Again, it should be understood that the communication method of the present invention could be implemented using any type of commercially available hardware and software including various types of protocol specific drivers.

Access controller 16 includes memory module 90 associated with a host processor 95, a shared memory module 91, a plurality of network process units 93, and a network interface module 94. Host processor 95 and associated memory module 90 is preferably implemented using a Pentium IV-based host, although it should be understood that any commercially available processing host with sufficient memory and processing speed could be used.

FIG. 3B illustrates the specific software modules and their interrelationship within access server 16. The software of access controller 16 is adapted to support the high level features of radio unit management (e.g. auto configuration, software loading, failover, statistics), mobile unit services (e.g. connection management, address assignment) and access security (e.g. RADIUS security, captive portal features, 802.11i), policy features (e.g. packet filtering, QOS), mobility (inter and intra access controller), VNS (i.e. traffic steering, VLAN), and system management (i.e. SNMP, bootp, HTML, accounting and statistics) as will be further discussed.

Host processor 95 includes a WASSP service module 130, a system manager 100, a routing manager 102, a security manager 104, and a DHCP module 106 to keep track of IP addresses. Host processor 95 constitutes a management plane that provides high level management functionality (i.e. management plane) to access controller 16 and is capable of interfacing with a Web server and other back end interfaces.

Shared memory module 91 includes data for routing and filtering data packets as well as for radio unit 18 and mobile unit 30 sessions. Specifically, shared memory module 91 includes packet buffers 108, filter 110, mobile unit parameter table 112, mobile user statistics table 114, radio unit parameter table 116, and a radio unit statistics table 118.

Network processor unit 93 includes redirection module 120, policy manager 122, filter manager 124, forwarding manager 126, session manager 128. Network process unit 93 is functionally divisible into a control plane and a data plane which share access to shared memory module 91. The control plane of network process unit 93 communicates with host processor 95 via a PCI bus or via an Ethernet link.

Data received at network interface module 94 is read into the packet buffer table 108 and is processed according to the rules mandated by the information in the session tables associated with shared memory 91. These session tables provide the definition for registered devices in the mobile and radio unit parameter tables 112 and 116. These definitions dictate the policy to be applied to registered devices, such as the filter definitions stored in filter definition table 110 that apply to such packets. Most of the packets received at the network interface module 94 represent mobile unit 30 packets that can derive enough treatment information from the session tables stored in the stored memory 91 and be processed entirely within the network interface 94 realm. However, packets not directly related to the data flow of a registered mobile unit 30 are delivered for further processing to network processor unit 92.

Specifically, WASSP packets relevant to the control and management of registered devices are handled by WASSPd service module 130, which processes the packets and interacts with the necessary application within session management module 128, which in turn may interact with additional 124 or even with system manager 100 for configuration related activities. Additionally, packets originating from mobile unit 30 or from other network hosts connected to access controller 16 may be delivered to host processor 95 for processing if they pertain to network management and representation services (e.g. address requests handled by DHCP server 106 or routing updates handled by routing manager 102). Mobile unit 30 packets that relates to user authentication may be processed by the redirector modue 120 in cooperation with the security manager 104 which is responsible for the propagation of user authentication status change notifications.

Referring now to FIGS. 1A, 4A, 4B and 4C, as discussed above, the present invention achieves effective segmentation of mobile units 30 by providing strong control and data path linkages between access controller 16 and radio units 18. This allows various emerging wireless LAN services (e.g. security with 802.11i, QoS with 802.11e, etc.) to be applied to end-to-end mobile device communications.

Specifically, radio unit 18 and access controller 16 are in communication with each other within wireless network 10 at layer 3. This is achieved by encapsulating the necessary data in an IP (Internet protocol) packet with an IP header. This allows access controller 16 to be in a different physical location from radio unit 18, while still allowing communication between access controller 16 and radio unit 18. Through this encapsulation, data and control information can be exchanged between radio unit 18 and access controller 16. These IP packets with their IP headers are transferred on the network using UDP/IP, although it should be understood that any suitable protocol such as TCP/IP (or even an independent protocol on top of IP) could be used.

Figure 4C:
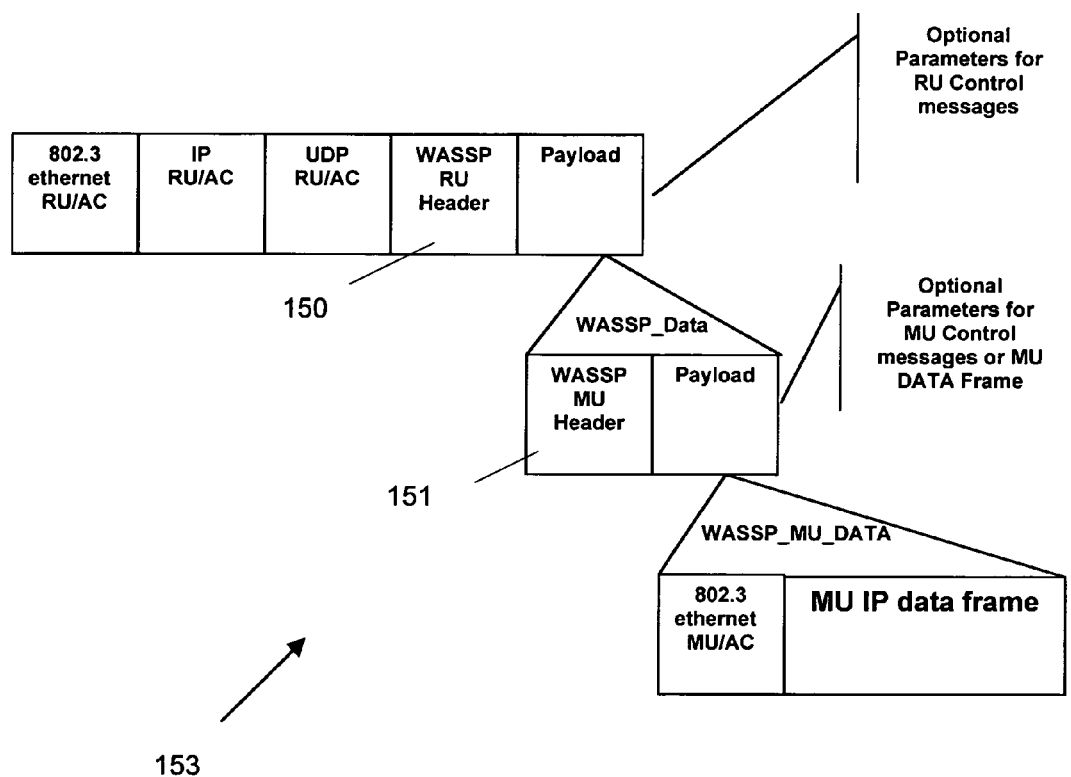
FIG. 4C is a schematic diagram illustrating the incorporation of the headers into a WASSP data packet.

FIGS. 4A and 4B illustrate the headers added to the data to form an IP packet used in communicating between radio unit 18 and access controller 16 and FIG. 4C illustrates how these headers are incorporated into the general WASSP data packet. The data in the IP packet is treated as two separate layers, namely a radio unit layer having a RADIO UNIT HEADER 150, and mobile unit layer having a MOBILE UNIT HEADER 151. Once the IP packet reaches access controller 16, the headers 150 and 151 are removed and radio unit layer and mobile unit layer messages are interpreted by access controller 16.

FIG. 4A illustrates RADIO UNIT HEADER 150. The radio unit layer is used to establish a communication session between radio unit 30 and access controller 16. Once this session is established, this layer is then utilized as the transport for the mobile unit layer. RADIO UNIT HEADER 150 includes the header fields: Version, TYPE, SEQUENCE#, FLAGS, SESSION ID and LENGTH. The header field Version specifies the protocol version. The radio unit header field TYPE (note there is a mobile unit TYPE field which will be discussed later) identifies the type of radio unit message that is contained in the packet. The header field SEQUENCE# is used to determine the order for multi-packet transmissions that occur when an original packet is fragmented into several packets. The header field FLAGS provides notification of message flow related information (e.g. an indication that a particular message represents the last message in a sequenced set). For example, these fields are used in the situation where a packet is received from mobile unit 30 or from a host that sends a packet that is at the maximum packet size for Ethernet. Since the packet then needs to be encapsulated into the WASSP packet and more data needs to be added to it, the maximum packet size supported by Ethernet would be exceeded. Accordingly, it is necessary to split the packet apart into fragments that will fit into the Ethernet packet. The header field SESSION ID (16) identifies the radio unit session to associate the message with. The header field LENGTH specifies the length of the payload.

FIG. 4B illustrates the MOBILE UNIT HEADER 151. It should be noted that the first few fields of MOBILE UNIT HEADER 151 constitute the RADIO UNIT HEADER 150 discussed above. MOBILE UNIT HEADER 151 provides the means for mobile unit 30 to validate with access controller 16 and for the exchange of data between mobile unit 30 and access controller 16. Once this data is encapsulated at radio unit 18, the data is sent to access controller 16. As shown in FIG. 4C, MOBILE UNIT HEADER 151 is carried within the Payload segment associated with RADIO UNIT HEADER 150. The Version, SEQUENCE#, FLAGS, SESSION ID and LENGTH are part of the RADIO UNIT HEADER 150 that encapsulates the MOBILE UNIT HEADER 151.

MOBILE UNIT HEADER 151 also including the following mobile unit related header fields: TYPE, QOS, SSID, MU MAC ADDRESS and RESERVED. The first header field TYPE (mobile unit TYPE field) indicates the subtypes of MOBILE UNIT_DATA which indicates that this message is applicable to a particular mobile unit operation within radio unit 18. Put another way, the TYPE field indicates the purpose of the message as applicable to mobile operation, and may refer to control operations or simply to carry mobile unit 30 data. The QOS field is the QoS identifier.

The header field SSID contains the SSID that mobile unit 30 is using to access radio unit 18. It is being contemplated to change the designation SSID to VNS_ID in order to separate the SSID assignments from the corresponding policy provided by an SSID. Since mobile units 30 are mapped to a VNS, this field should be understood to represent their current association state to the representing VNS. The header field MU MAC address field contains the MAC address of mobile unit 30 accessing wireless network 10 through radio unit 18 or MU MAC ADDRESS. The header field RESERVED is reserved for future use.

As shown in FIGS. 4A and 4B, both RADIO UNIT HEADER 150 and MOBILE UNIT HEADER 151 allow for two types of messages, namely, radio unit layer messages and mobile unit layer messages. The messages used by the radio unit layer are specified in the header field TYPE field of the radio unit header 150 and include an authentication request message, an authentication confirmation message, a session data message, a set state message, a poll message, a halt message and a re-activate message.

Service Location Protocol (SLP) is used by radio unit 18 to discover the location of access controller 16. Access controller 16 uses the SLP message to offer its services to radio unit 18. The authentication request message is used by radio unit 18 to request registration of a radio unit session with access controller 16. The authentication confirm message is used by access controller 16 to confirm the registration of the registration of a radio unit session for radio unit 18 in storage module 60 of access controller 16. The session data message is used as the transport of mobile unit layer messages. When session data message is indicated in header field TYPE field of radio unit header 110, the message body is not interpreted by radio unit layer. The set state message allows access controller 16 to alter the operation state of radio unit 18. The poll message, allows access controller 16 to poll access controller 16 to re-activate radio unit 18. The re-activate message is used by access controller 16 to re-activate radio unit 18 when it has been halted. The halt message allows access controller 16 to halt operation of radio unit 18.

The messages used by the mobile unit layer are specified in the header field TYPE field of the mobile unit header 110 and are a subtype of radio units 18 WASSP_DATA message TYPE and carried as payload for WASSP_DATA as discussed above. In order for these mobile unit messages to be used, the MOBILE UNIT HEADER field TYPE (see FIG. 4B) must indicate a session data message. These messages include an associate request (Associate_Req), an associate response (Associate_Rsp), a re-association request (Re-association_Req), a re-association response (Re-association_Rsp), and most importantly a data transport (mu-data) message indicator. The mu_data is utilized as the transport for mobile unit 30 related data exchanges. In particular, during the user authentication phase of session establishment, these messages encapsulate the applicable message sets for user authentication that are comprised of an EAP (Extensible Authentication Protocol) request (EAP_Req), an EAP (Extensible Authentication Protocol) response (EAP_Rsp), a user authentication (User_Authentication_Req), a user validation (User_Validation_Rsp). Following authentication, the mu_data encapsulation then carries the user's data frames which provide network representation parameters such as a Dynamic Host Configuration Protocol (DHCP) request (DHCP_Req), and DHCP response (DHCP_Rsp); or general purpose data messages such as HTML requests (HTML_Req).

FIG. 4C is a schematic diagram which shows the complete WASSP data packet. It contains an 802.3 Ethernet RU/AC segment, an IP RU/AC segment, an UDP RU/AC segment, RADIO UNIT HEADER 150, and a RU Payload segment. The RU Payload segment contains operational parameters for RU control messages and specifically contains WASSP_Data comprising MOBILE UNIT HEADER 151 and a MU Payload segment. The MU Payload segment contains optional parameters for MU control messages or MU Data frame and specifically, WASSP_MU_DATA which comprises an 802.3 Ethernet MU/AC segment and a MU IP data frame segment.

Figure 5A:
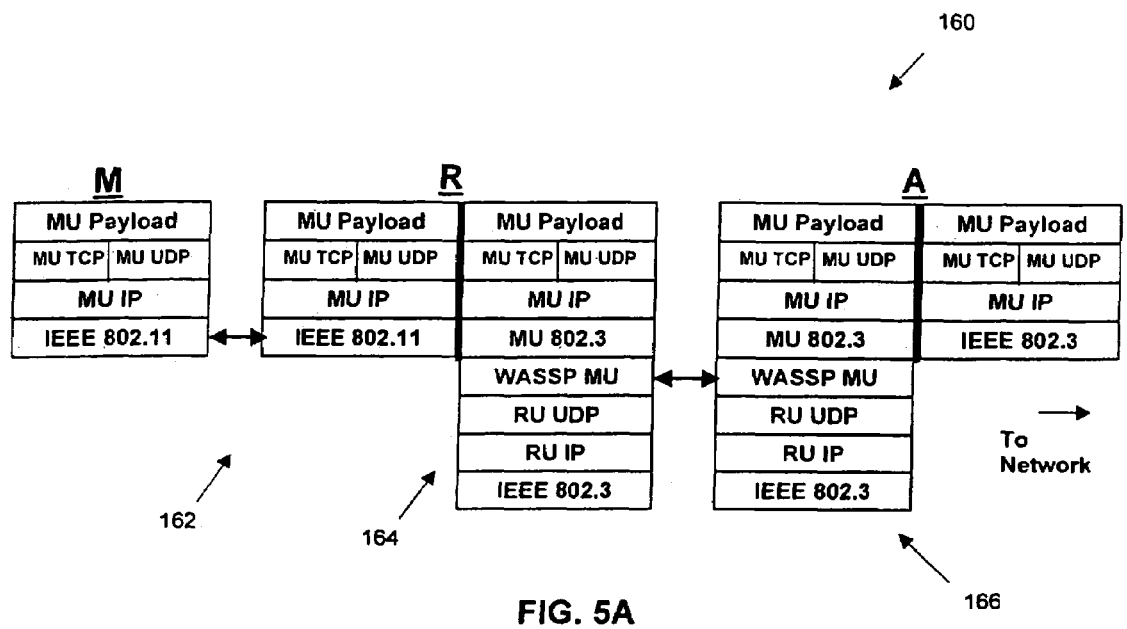
FIG. 5A is a schematic of the mobile unit end-to-end protocol stack associated with the mobile unit, radio unit and access controller of FIG. 1.
Figure 5B:
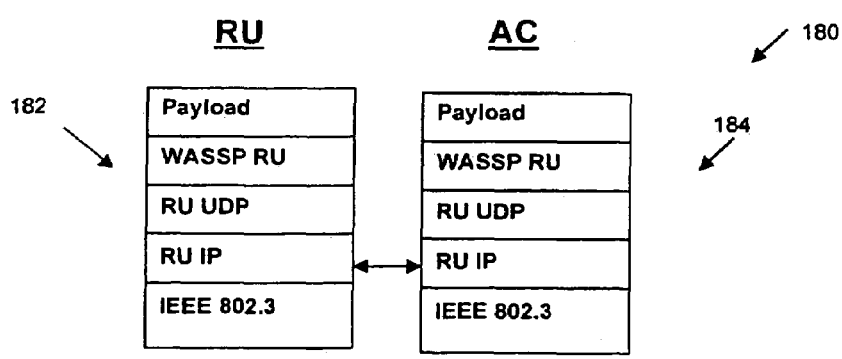
FIG. 5B is a schematic of the protocol stack associated with the radio unit and the access controller of FIG. 1.

FIGS. 5A and 5B illustrate the protocol stacks associated with the mobile unit 30, radio unit 18 and the access controller 16 of wireless network 10. FIG. 5A illustrates the protocol stack that exists between mobile unit 30 and the end host that it wishes to communicate with. FIG. 5B is the protocol stack for communications between radio unit 18 and access controller 16. As is conventionally known, there are three main protocol layers, namely the Medium Access Control layer (MAC), the Network layer and the Transport layer. The MAC layer controls which device is allowed to transmit a message and helps to avoid "collisions" of data packet transmissions. The Network layer handles routing between nodes that are not directly connected. The Transport layer provides end-to-end application layer conversation between network nodes.

Now referring to FIG. 5A, the end-to-end communication protocol stack 160 between mobile unit 30 and an end host through radio unit 18 and access controller 16 is illustrated. The mobile unit protocol stack 162 associated with mobile unit 30 consists of four layers, namely a MU Payload layer, a MU TCP MU layer, a MU IP layer and an IEEE 802.11 layer. The MU TCP MU layer manages the assembling of messages into smaller packets for transmission over the wireless network to radio unit 18. The MU IP layer handles the address part of each data packet. It should be noted that MU Payload, MU TCP MU, and MU IP layers are not affected during the exchange of messages between radio unit 18 and access controller 16. That is, to mobile unit 30 and the end host, radio unit 18 and access controller 16 appear to be transparent at the MU IP MU level and above.

Radio unit protocol stack 164 contains eight protocol layers but only utilizes four protocol layers to communicate with access controller 16. Specifically, radio unit protocol stack 164 includes a MU payload layer, MU TCP MU layer, MU IP layer, MU 802.3 layer, WASSP MU layer, RU UDP layer, RU IP layer, and an IEEE 802.3 layer representing the radio unit's wired parameters. MU TCP MU layer that receives the packets from mobile device 30 via the RF interface 62 and reassembles them into the original message. Radio unit 18 provides conversion from IEEE 802.11 to IEEE 802.3 and provides WASSP encapsulation of packets being sent to access controller 16 having the MOBILE UNIT HEADER 151. Correspondingly, radio unit 18 provides conversion from IEEE 802.3 to IEEE 802.11 and WASSP de-encapsulation of packets being received from access controller 16. It should be understood that radio unit 18 never looks at the MU IP layer or those layers above (i.e. the top four layers are maintained intact through WASSP encapsulation).

Access controller protocol stack 166 associated with access controller 16 contains all eight layers of the radio unit protocol stack 164 and provides the MU Payload layer, MU TCP MU layer, MU IP layer, and the IEEE 802.3 layer to back-end network 50. Access controller 16 is responsible for removing the WASSP header from MOBILE UNIT HEADER 151 and converting the 802.3 headers from mobile unit 30 into new 802.3 headers. Access controller 16 only uses MOBILE UNIT HEADER 151 to determine which interface to send the packet out on.

FIG. 5B illustrates the protocol stack 180 associated with the communication between radio unit 18 and access controller 16 and the RADIO UNIT HEADER 150. The radio unit protocol stack 182 and the access controller protocol stack 184 both consist of five protocol layers, namely a Payload layer containing information associated with the Radio Unit Header TYPE, a WASSP RU layer, a RU UDP layer, a RU IP layer and an IEEE 802.3 layer.

Figure 6:
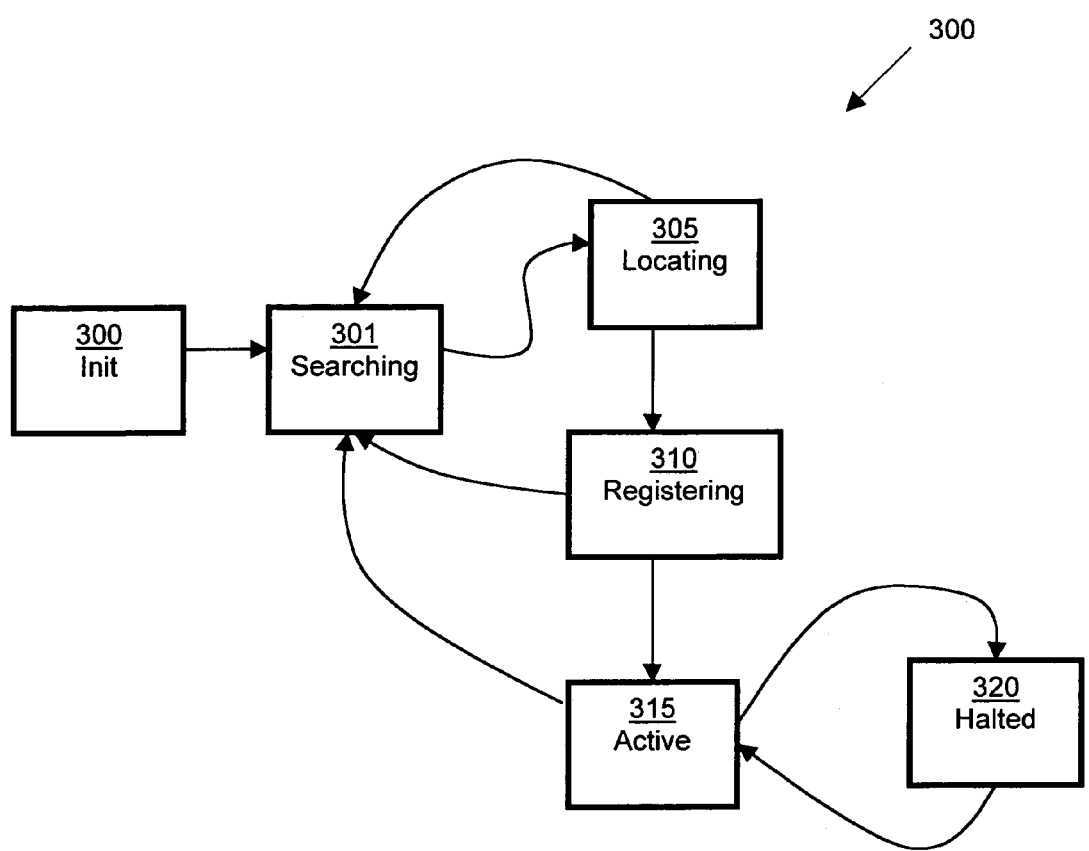
FIG. 6 is an event state diagram showing the different states of the radio unit of FIG. 1.

FIG. 6 illustrates an event state diagram 300 for radio unit 18 indicating the logical operational states when radio unit 18 is first connected to wireless network 10.

First, when radio unit 18 first connects to wireless network 10, radio unit 18 goes through an INIT state (300). This INIT state (300) represents the initialization of the hardware in radio unit 18. When the INIT state (300) has been completed, radio unit 18 moves to a SEARCHING state (301). The SEARCHING state (301) represents the discovery procedure by radio unit 18 over network 50 in order to locate an appropriate access controller 16 with which to associate. Radio unit 18 then moves to the LOCATING state (305). in the LOCATING state (306), radio unit 18 waits to receive an offer message from access controller 16. If radio unit 18 does not receive an offer to associate from access controller 16 within a set period of time, radio unit 18 returns to the SEARCHING state (301). If an offer message is received by radio unit 18 from access controller 16, then radio unit 18 enters the REGISTERING state (310).

In the REGISTERING state (310), radio unit 18 transmits its authentication request to access controller 16 and then waits until an authentication response is received from access controller 16. If the authentication request fails, radio unit 18 reverts to the SEARCHING state (301). If authentication request is successful, radio unit 18 enters the ACTIVE state (315). In the ACTIVE state (315), access controller 16 stores radio unit session data 90 for radio unit 18 in storage means 60 and assigns radio unit session data 90 a session ID as discussed above.

Once radio unit 18 has been registered within wireless network 10, access controller 16 transmits configuration parameters (e.g. a list of SSIDs that access controller 16 will support) to radio unit 18. Radio unit 18 will remain on the ACTIVE state (315) until radio unit 18 terminates or until communication between radio unit 18 and access controller 16 is interrupted. When either of these events occurs, radio unit 18 will respond with a poll message. If polling is implemented and a timeout occurs, radio unit 18 will then return to the SEARCHING state (301). During the operation of wireless network 10, access controller 16 may want radio unit 18 to halt its operations. Access controller 16 can do this by sending halt message to radio unit 18 and radio unit 18 which will cause radio unit 18 to enter HALT state (320). Access controller 16 can then tell radio unit 18 to re-enter active state (301) when desired.

Radio unit 18 is associated with a number of important operational variables, including RU STATUS, RU MAC ADDRESS, RU IP ADDRESS, RU BIND KEY and SSID. The RU STATUS variable describes the current state of radio unit 18 (i.e. whether radio unit 18 is in HALT (320) state or ACTIVE (315) state) and whether access controller 16 is unreachable. The RU MAC ADDRESS variable is the 802.3 Ethernet address of radio unit 18. The RU IP ADDRESS variable is the IP address assigned to radio unit 18 from a DHCP server. The RU BIND KEY variable is a unique key that identifies radio unit 18 to access controller 16 and provides authentication for radio unit 18. The SSID variable is the service set identifier that is set on radio unit 18 by access controller 16.

As discussed above, when radio unit 18 is added to wireless network 10, radio unit 18 proceeds through a number of operational states. When radio unit 18 enters REGISTERING state (310), access controller 16 can determine many of the radio unit 18 variables, namely RU STATUS, RU MAC ADDRESS, RU IP ADDRESS, RU BIND KEY, RU_SERIAL_NUMBER, discussed above. From this information, access controller 16 can then determine the applicable set of configuration parameters and attributes such as SSID and default VNS association. In addition, access controller 16 an determine the RU TEXTUAL IDENTIFICATION STRING variable which is configured on access controller 16 and which contains information related to the use or location of radio unit 18. However, in order to determine a complete set of VNS factors for a particular mobile unit session, a number of other variables must still be discovered by access controller 16.

Figure 7A:
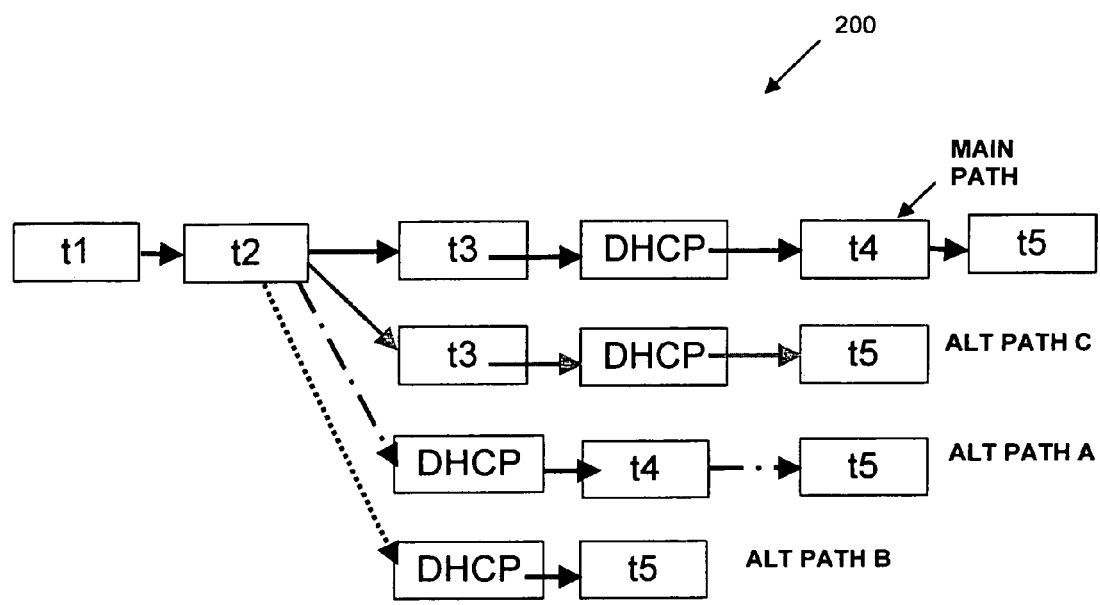
FIG. 7A is an event sequence diagram illustrating the timing events that occur during the connection of a mobile unit within the wireless LAN of FIG. 1.

FIG. 7A is an event timing diagram 200 that describes the connection process of mobile unit 30 at the beginning of a mobile unit session. As shown, five different events can occur. At each of these events access controller 16 discovers various VNS factors. It should be understood that the following discussion only represents an example of the type of functionality contemplated and that the specific implementation of the connection process depends on the specific software utilized.

At the first event of the connection process, namely event t1, access controller 16 learns a substantial amount of information about mobile unit 30 and radio unit 18. Specifically, at event t1, access controller 16 discovers the SSID, RU MAC ADDRESS, RU IP ADDRESS, and MU MAC ADDRESS associated with mobile unit 30 and radio unit 18. Default preliminary VNS identification based on the providing RU may be assigned to the MU, based on attributes such as SSID, default VNS_ID and even the specific RU_ID. Radio unit 18 sends out a beacon message that is received by mobile unit 30. Mobile unit 30 responds to beacon message with a request to associate. Radio unit 18 uses the data transmitted in request to associate to communicate SSID, RU MAC ADDRESS, and RU IP ADDRESS and MU MAC ADDRESS to access controller 16. A corresponding association response is then sent by access controller 16 to radio unit 18 and radio unit 18 uses the data received from this association response message from access controller 16 to respond to mobile unit 30 with response to associate. Accordingly, the VNS factors for the mobile unit session data that are discovered during this time segment, t1, are the SSID, the RU MAC ADDRESS, and RU IP ADDRESS, and the MU MAC ADDRESS.

Event t2 is the authentication determination event. At event t2, access controller 16 determines if mobile unit 30 is capable of an 802.1x exchange or not and accordingly, the VNS factor of the security mechanism is discovered. Depending on what is learned at event t2, various event paths can be adopted. The following is a discussion of the main event path which is taken when mobile unit 30 is capable of IEEE 802.1x security. The alternative paths A, B, and C which are taken in various other situations will be discussed separately.

Event t3 is the next event in the main event path and is the result of authentiation determination discussed above in event t2. It is at event t3, that the access controller 16 can learn the VNS factor of USER ID. Specifically, since mobile unit 30 is capable of IEEE 802.1x security (i.e. the main event path is taken), mobile unit 30 transmits a user authentication request to radio unit 18. Radio unit 18 then communicates with access controller 16 and communicates the VNS factor USER ID to access controller 16. In accordance with the IEEE 802.1x standard, access controller 16 authenticates the USER ID with authentication server 22. When the USER ID has been validated, access controller 16 communicates a response to radio unit 18, which in turn communicates a validation response to mobile unit 30.

At this point mobile unit 18 is assigned an IP address. Specifically, mobile unit 30 initiates a DHCP request to radio unit 18, which in turn forwards a DHCP request via WASSP data encapsulation to access controller 16. Access controller 16 obtains the required IP addresses and related information based on the applicable VNS network parameters and a corresponding DHCP response is sent to radio unit 18 (via WASSP). Radio unit 18 communicates another DHCP response to mobile unit 30 (i.e. the dynamic IP address at issue).

Event t4 is the next event in the main path event sequence. At event t4, access controller 16 can determine the USER ID by a redirection effort or Captive Portal. Captive Portal authentication is implemented by intercepting the first http message sent by mobile unit 30 (e.g. typically a request to visit the home page of the user) and redirect the http message to a different Web server, setup as an interface to authentication server 22. This Web server will provide a login screen to the user where their userid and password can be entered in order to continue the user session and to obtain network access. The corresponding authentication web site, formats the userid information and forwards it to authentication server 22 (e.g. a RADIUS or a LDAP-based server) for approval.

Event t5 is the final event in the main path event sequence. The exchanges between mobile unit 30, radio unit 18 and access controller 16, that occur before this event, t5, occur as a result of mobile unit 30 transferring between radio units 18. For this event, only the VNS factors of the RU MAC ADDRESS, and RU IP ADDRESS, will change. That is, when mobile unit 30 moves out of range of one radio unit 18 and into the range of another radio unit 18, depending on the applicable protocol being used, some kind of re-association procedure is adopted.

In the case of the 802.11 protocol, a re-association request is sent by mobile unit 30 to radio unit 18 and radio unit 18 sends this request to access controller 16. Access controller 16 returns a response to the radio unit 18 and radio unit 18 transmits a response to mobile unit 30. It should be understood that the association message could simply be used again (as opposed to the new re-association request discussed above). Accordingly, at event t5, access controller 16 discovers the following VNS factors: the SSID, the MU MAC ADDRESS, the RU MAC ADDRESS, and the RU IP ADDRESS. In the typical scenario the mobile unit 30 session and the corresponding VNS assignment remains unchanged following re-association. It should be understood that location based services may then affect the set attributes.

There are several optional event paths that can be taken based on what is learned within event t1 and t2.

For event path C, mobile unit 30 is capable of 802.1x and accordingly 802.1x authentication is conducted (i.e. event t3). After which, the mobile unit 30 initiates a DHCP request to obtain an IP address. However, it skips event t4 and does not conduct a captive portal. The next event would be t5 as discussed above.

If mobile unit 30 is not capable of 802.1x, then event t3 is skipped and alternative event path A is taken. If mobile unit 30 is not capable of 802.1x then a DHCP assignment is conducted and a captive portal authentication (as discussed above) is conducted (i.e. event t4). The next event would be t5 as discussed above.

Alternatively, if at event t2, it is determined that there should be no authentication, then alternative event path B is taken. Specifically, all parameters are decided at t2, a DHCP assignment is conducted and the next event is t5 as discussed above.

FIG. 7B is a table that indicates which VNS factors for a mobile unit session are discovered by access controller 16, during each of the five different events of the mobile unit 30 connection process. At event t1, the SSID, RU MAC ADDRESS, RU IP ADDRESS and MU MAC ADDRESS are all discovered. At event t2, the security mechanism that will be used during the session is discovered. At event t3, the USER ID of the mobile unit 30 is discovered through the 802.1x exchange. At event t4, the USER ID is discovered through the Captive Portal effort. Finally, for event t5 the RU MAC ADDRESS and the RU IP ADDRESS of the new radio unit 18 is discovered.

Referring back to FIGS. 1A and 1B, access controller 16 assigns mobile unit 30 to virtual networking services (VNS) on the basis of data communicated between radio unit 18 and access controller 16, which is in turn based on data received by radio unit 18 from mobile unit 30. When mobile unit 30 begins the connection process to wireless network 10 through radio unit 18, access controller 16 creates a mobile unit session for mobile unit 30 and stores it as mobile unit session data in mobile unit session table 72 in memory 60. Specifically, during the connection process of mobile unit 30 to radio unit 18, relevant data sent by mobile unit 30 to radio unit 18 is communicated by radio unit 18 to access controller 16.

Access controller 16 then uses this data to discover a number of certain so-called "VNS factors" associated with the mobile unit session. These VNS factors are a set of variables that provide information about what is known about the mobile unit session at a specific point in time. The VNS factors include RADIO UNIT, Service Set Identifier (SSID), Ingress interface (PORT), security mechanism, USER ID, and the MAC address of the mobile unit 30 (MU MAC ADDRESS). The RADIO UNIT factor represents the specific radio unit 18 that mobile unit 30 is accessing. The SSID and Ingress interface (PORT) represents which group of radio units 18 that mobile unit 30 is accessing wireless network 10 through. The security mechanism represents the type of security protocol being utilized (e.g. no authentication, Captive Portal, or 802.1x, etc.)

The USERID factor may be initially provided by mobile unit 30 during a connection attempt. The way that USERID is entered is dependent on the particular security mechanism being utilized. For example, in the case of 802.1x, the USERID is passed from mobile unit 30 to radio unit 18 and then forwarded to the access controller 16 within an encapsulated EAP message. In this case, access controller 16 could have access to the USERID and does not require a response from authentication server 22. However, USERID can also be discovered through a RADIUS response from authentication server 22, which may also include other information which would allow for the assignment of virtual networking services (VNS).

The VNS factors are stored by access controller 16 in shared memory 91 in association with the mobile unit session and are used to determine various associated so-called "VNS parameters" that are to be assigned to mobile unit 30 while it is connected to wireless network 10. These VNS parameters include: an authentication mechanism, an accounting mechanism, IP address pools, an egress interface or virtual router, a quality of service (QoS), packet filters and a walled garden.

The authentication mechanism VNS parameter is the process by which mobile unit 30 will be authenticated on wireless network 10. The accounting mechanism VNS parameter is how the activities of mobile unit 30 are kept track of while mobile unit 30 is accessing wireless network 10. Specifically, the accounting mechanism VNS parameter keeps track of the amount of time spent on the wireless network 10, the services accessed and amount of data transferred.

The Egress interface (or virtual router) VNS parameter is what identifies which specific interface or specific back-end network 50, mobile unit 30 traffic will be forwarded to. Specifically, according to the present invention, it is possible to forward mobile unit 30 traffic out of a specific interface or onto a specific back-end network 50. In the case where access controller 16 has connections to a number of independent (non-communicating) back-end networks 50, it is possible to confine mobile unit 30 traffic to a selected back-end network 50. This mechanism allows for mobile unit traffic to be restricted to an appropriate back-end network on the basis of the USERID of a mobile unit 30.

The quality of service or QoS VNS parameter specifies the minimum level of data throughput that mobile unit 30 will transfer to and from wireless network 10 (i.e. to achieve a certain level of quality of service). The IP address pool VNS parameter is a pool of IP addresses from which an IP address can be assigned to mobile unit 30. The packet filter VNS parameter specifies a desired pattern for the data packets transferred from mobile unit 30 to wireless network 10 or from wireless network 10 to mobile unit 30 that all data packets must match to be passed through the filter. The walled garden VNS parameter controls what information (e.g. Web sites) a mobile unit 30 is able to access on the Internet over wireless network 10. One walled garden VNS parameter setting could be used to screen out unwanted material or direct mobile unit 30 to sites endorsed by owners of wireless network 10, and another walled garden VNS parameter setting could be used to prevent mobile units 30 with limited capacity to display content (e.g. cell phones or PDAs), to access only those sites mobile unit 30 is physically able to display. An example of this mechanism is allowing cell phones to visit only sites encoded in WAP.

Each of these VNS parameters are divided into one of three VNS categories or groups, namely a network assignment category, a general policies category and a location and time based category. Accordingly, each of these VNS categories is a group of VNS parameters that are applied to a particular mobile unit session. Within each VNS group category variants are possible based on the influence of the different VNS factors at issue. That is, for a particular VNS parameter associated with a VNS category, the specific representation of the VNS category may be affected by related conditions (e.g. the type of security mechanism may affect the end value of the network assignment).

The network assignment VNS category is a group of VNS parameters that define the network that the mobile unit session will be associated with. The network assignment VNS category includes the IP address pool and Egress Interface/Virtual Router VNS parameters. Once the network assignment parameters are defined, they remain for the duration of the session and cannot be changed without creating a new mobile unit session. As discussed above, in the case of network assignment, the network assignment group may define the IP address pool and the Egress interface based on the type of security mechanism VNS factor. Accordingly, mobile units 30 with 802.1x would have a network assignment that represents the corporate network whereas mobile units 30 without 802.1x would have a network assignment that represents the Internet.

The general policy VNS category is a group of VNS parameters which define the set of policies that will be applied to a mobile unit session. The general policy VNS category includes the accounting mechanism, the quality of service (QOS), packet filters and walled garden (if applicable) VNS parameters. As is the case for network assignment, once these policies are defined they remain for the duration of the session and cannot be changed without creating a new mobile unit session. The general policy parameters are essentially the default parameters that are associated to a VNS upon the connection of mobile unit 30 connecting to wireless network 10.

The location and time-based VNS category is a group of VNS parameters that define a set of policies that will be applied to a session based on the location of its current connection or the current time. The location and time-based VNS category includes the accounting mechanism, the QoS and packet filters VNS parameters. These location and time-based VNS parameters overlap some of the general policy parameters and can either override the general policy parameters where there are conflicts or add to the general policies. The location and time-based parameters are the only category of the three that can be altered after mobile unit 30 has completed the connection process to wireless network 10 (i.e. as mobile unit 30 moves from location to location or based on time of day).

Figure 8A:
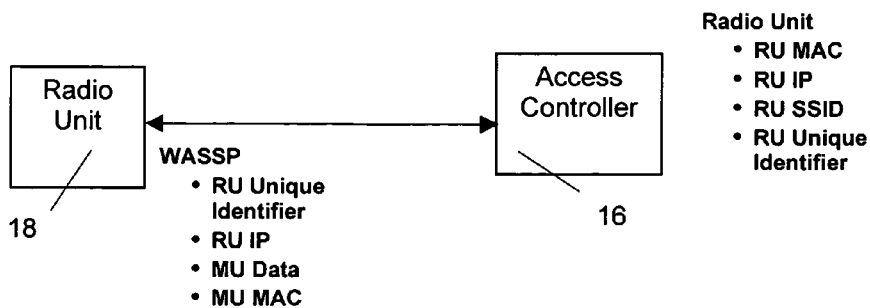
FIG. 8A is a schematic diagram illustrating the VNS factors known by the access controller and the VNS factors discovered by the radio unit and communicated to the access controller during time segment t1.
Figure 8B:
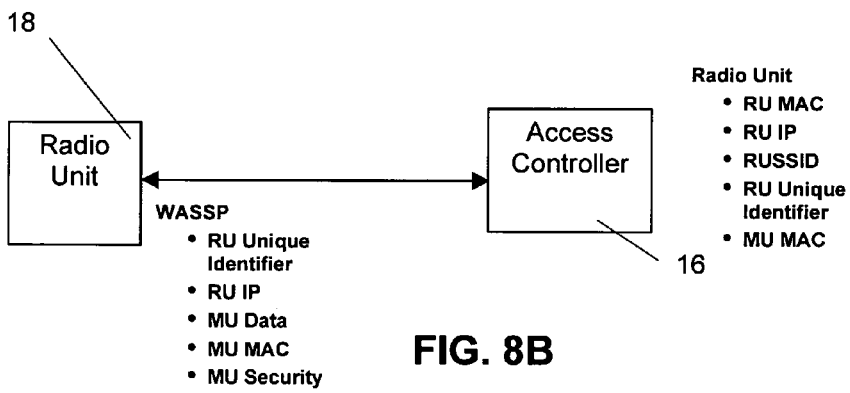
FIG. 8B is a schematic diagram illustrating the VNS factors known by the access controller and the VNS factors discovered by the radio unit and communicated to the access unit during time segment t2.
Figure 8C:
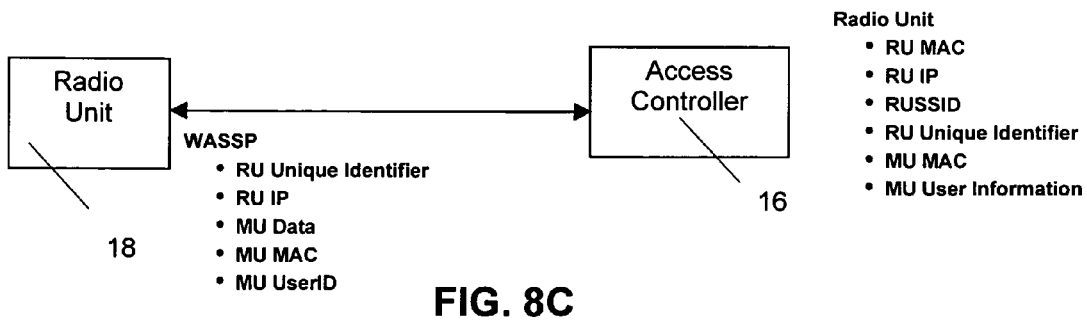
FIG. 8C is a schematic diagram illustrating the VNS factors known by the access controller and the VNS factors discovered by the radio unit and communicated to the access controller during either time segment t3 or t4.

FIGS. 8A, 8B and 8C illustrate communication between radio unit 18 and access controller 16 for the events discussed above.

FIG. 8A shows the VNS factors communicated to access controller 16 from radio unit 18 for event t1. As detailed above, access controller 16 is already aware of several VNS factors relating to radio unit 18 when mobile unit 30 begins connection process. These VNS factors are, RU MAC ADDRESS, RU IP ADDRESS, SSID and RADIO UNIT SESSION IDENTIFIER (which provides reference to the RADIO Unit's UNIQUE IDENTIFIER). RU BIND KEY is only used during radio unit 18's registration process as a method to obtain an access controller 16 registered SESSION ID. From then on, the SESSION ID determines the radio unit 18 identification from local memory storage using the RU BIND KEY or any other identifier including IP and Serial number.

For event t1, radio unit 18 communicates to access controller 16, the RADIO UNIT SESSION ID and RU IP ADDRESS VNS factors and mobile unit data from the association request, which includes MU MAC ADDRESS. The SESSION ID and MU IP ADDRESS are used by access controller 16 to determine which VNS factors to associate with mobile unit session. Specifically, when radio unit 18 goes through the registration process with access controller 18, radio unit 18 uses the BIND KEY to prove authentication after which it is assigned a SESSION ID. The SESSION ID is then used from then on to indicate which radio unit 18 the data packet was received from.

FIG. 8B illustrates the communication between radio unit 18 and access controller 16 for event t2. As shown in FIG. 8B, access controller 16 has already discovered the RU IP ADDRESS, the SSID, RU SESSION ID, RU LOCATION, RU BIND KEY and MU MAC ADDRESS VNS factors for the mobile unit session. Factoring in RU LOCATION into VNS decisions can be beneficial as it can allow for different behaviour or even traffic characteristics and shaping profile depending of where the providing radio unit 18 (i.e. and accordingly the mobile unit 30) actually geographically is located. Radio unit 18 communicates to access controller 16 the RU SESSION ID, RU VNS Assigned ID , RU IP ADDRESS, and mobile unit variables learned from the EAP request (225), including MU MAC ADDRESS and mobile unit security mechanism. It should be noted that the SESSION ID is what is actually exchanged in data messages. From SESSION ID we can determine any other factor and accordingly this VNS factor provides all the indexing and identification needed. The only message that uses the BIND KEY is the RU_REGISTER_REQUEST that uses it to establish the validation means for the creation of a RU session (identified by RU SESSION ID). RU SESSION ID, RU IP ADDRESS and MU MAC ADDRESS, which are shown being communicated between radio unit 18 and access controller 16 in FIG. 8B, are used to determine which mobile unit session the new VNS factors belong to.

FIG. 8C illustrates the communication between radio unit 18 and access controller 16 for event t3 or event t4. As shown in FIG. 8C, access controller 16 has already a discovered a number of VNS factors and associated them with mobile unit session data. These VNS factors include: RU MAC ADDRESS, RU IP ADDRESS, the SSID, RU SESSION ID, RU LOCATION, RU BIND KEY, MU MAC ADDRESS and USER ID. The information communicated to access controller 16 from radio unit 18 is RU SESSION ID, RU IP ADDRESS and mobile unit 30 data. The mobile unit 30 data includes the MU MAC ADDRESS and mobile unit 30 USER ID.

FIG. 9 is a table illustrating, which VNS parameters can be determined by access controller 16 for which events. This table shows at which event a VNS parameter can first be determined, which is designated by an X. It also shows for which events a VNS parameter can be changed, which is shown by a proceeding X, and finally, at which event a VNS parameter must be finally determined, shown by the last X in the row. From the table in FIG. 8, it can be seen that the authentication mechanism VNS parameter can be first determined at t1 and must be finally determined at t2. The accounting mechanism VNS parameter can first be determined at t1 and can be altered during any of the proceeding events. The IP address pools VNS parameter can first be determined at t1, can be altered at t2 and must finally be determined at t3. The Egress interface or virtual router For the VNS parameter can first be determined at t1, can be altered at t2 and must finally determined at t3. The QoS and packet filters VNS parameters can be determined first at t1 and can be altered at any of the events. The walled garden VNS parameter can be determined first at t1, can be altered at t2 and t3 and must finally be determined at t4.

Figure 10:
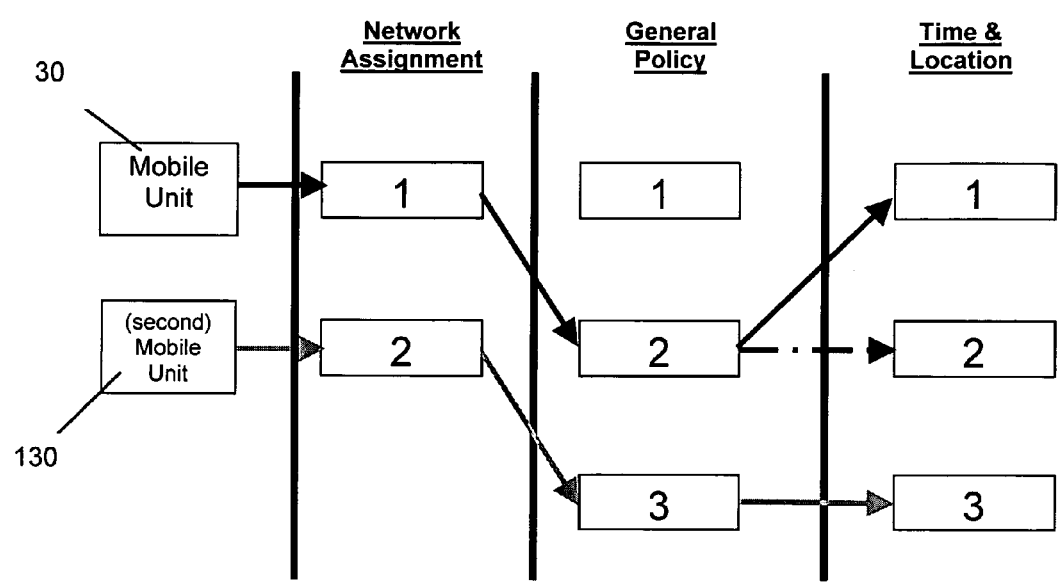
FIG. 10 is a schematic diagram showing the assignment of a mobile unit to different groups within each of the three categories of VNS parameters.

FIG. 10 illustrates two separate mobile unit sessions and the different VNS parameters they might be assigned to for each VNS category during the connection process of mobile unit 30. A mobile unit 30 connects to wireless network 10 through radio unit 18' (not shown). As explained above, the VNS factors are discovered and the corresponding VNS parameters are determined. Based on the VNS factors, a mobile unit session data would be assigned specific VNS parameters as depicted by group 1 of the network assignment VNS category, specific VNS parameters as depicted by group 2 of the general policy group VNS category and specific VNS parameters as depicted by group 1 of the time and location group VNS category.

Mobile unit 30 then moves to another location where it accesses wireless network 10 through a new radio unit 18"

(also not shown). After mobile unit 30 reconnects to a new radio unit 18", mobile unit 30 is reassigned specific VNS parameters as depicted by group 2 of the time and location group category as shown. Further, when a second mobile unit 130 accesses wireless network 10, the second mobile unit 130 is assigned a different set of VNS groups, namely group 2 of the network assignment group category, group 3 of the general policy group category and finally, group 3 of the time and location group category.

As can be seen in FIG. 10, the VNS parameters in the time and location group category can change over time or if a mobile unit 30 is moved to another location where it accesses wireless network 10 through a new radio unit 18 (not shown). There are several scenarios where it is useful to have VNS parameters change over time. One scenario where it may be is where a user buys a block of time to access wireless network 10. After a set amount of time (i.e. the time purchased runs out), access controller 16 can deny mobile unit 30 access to wireless network 10. Another scenario, might be for use in public areas (e.g. a library) where mobile unit 30 is given access to wireless network 10 during hours when the public place is open, but where access to the wireless network 10 is denied slightly before closing time. The provision of location based services may also be taken into consideration.

As illustrated above, VNS parameters can be combined as mobile unit 30 connects to the wireless network 10 or when mobile unit 30 is re-associated with new radio unit 18 (not shown). Therefore, some mechanisms are necessary to combine or alter the VNS parameters assigned to a mobile unit 30 session in certain circumstances. First, an overwrite mechanism is required to provide the ability to overwrite a current VNS parameter with a new VNS parameter. An additional mechanism is required to allow a VNS parameter to be added to the mobile unit session. A subtraction mechanism is also required to allow VNS parameters to be removed as the VNS factors associated with a mobile unit session become known or changed.

As will be apparent to those skilled in the art, various modifications and adaptations of the structure described above are possible without departing from the present invention, the scope of which is defined in, the appended claims.

The invention claimed is:

1. A wireless network for supporting mobile unit segmentation for a plurality of mobile units in order to associate each mobile unit with virtual networking services (VNS), said network comprising:
    (a) a first radio unit for initiating the connection of the mobile unit to the network by transmitting and receiving communication data to and from the mobile unit, and for facilitating configuration of said mobile unit segmentation during the connection;
    (b) an access controller coupled to said radio unit and configured to:
        (i) receive said communication data from said radio unit during the connection of each mobile unit;
        (ii) determine a plurality of individual configurable VNS factors for the mobile unit communication session based on said communication data;
        (iii) associate the mobile unit with virtual networking services based on said individual configurable VNS factors; and
        (iv) establish a mobile unit communication session based on the individual configurable VNS factors discovered during the connection process such that the mobile unit communication session has the network characteristics defined by the assigned virtual networking services; and
    (c) a plurality of back-end networks, wherein said access controller restricts access by the mobile unit to one of said plurality of back-end networks through an Egress Interface/Virtual Router VNS parameter on basis of a USER ID VNS factor associated with the mobile unit.

2. The network of claim 1, wherein said radio unit is adapted to encapsulate said communication data for communication to said access controller.

3. The network of claim 1, wherein said VNS factors are selected from the group consisting of SSID, RU MAC ADDRESS, MU MAC ADDRESS, SECURITY MECHANISM, USER ID.

4. The network of claim 1, wherein said virtual networking services are defined by at least one VNS category, where each VNS category includes a plurality of VNS parameters selected from the group consisting of: Authentication Mechanism, Accounting Mechanism, IP address pools, Egress Interface/Virtual Router, Quality of Service (QoS), Packet Filters, and Walled Garden.

5. The network of claim 4, wherein said VNS factors are selected from the group consisting of SSID, RU MAC ADDRESS, MU MAC ADDRESS, SECURITY MECHANISM, USER ID.

6. The network of claim 1, wherein said mobile unit and said first radio unit and said access controller are adapted to exchange requests and responses during the connection of said mobile unit at a plurality of time events.

7. The network of claim 6, wherein at the first time event, access controller discovers the VNS factors SSID, RU MAC ADDRESS and MU MAC ADDRESS.

8. The network of claim 6, wherein at a second time event, access controller discovers the VNS factor SECURITY MECHANISM.

9. The network of claim 6, wherein at a third and fourth time event, access controller discovers the VNS factor USER ID.

10. The network of claim 1, further comprising a second radio unit for re-associating the mobile unit to the network when the mobile unit passes out of range of said first radio unit into range of said second radio unit and wherein the VNS factors of RU MAC ADDRESS and MU MAC ADDRESS are re-obtained for this purpose.

11. The network of claim 1, wherein the access controller is further adapted to:
    (v) manage the mobile unit communication session over time in accordance with the VNS;
    (vi) manage termination of association of the mobile unit based on segment specific conditions; and
    (vii) roll-up, accounting and reporting of segment specific information.

12. The network of claim 1, wherein the first radio unit is adapted to perform the following steps in order to become registered within wireless network:
    (i) initializing the hardware within first radio unit;
    (ii) transmitting a discovery message over the wireless network in order to locate the access controller;
    (iii) waiting to receive an offer message from the access controller and returning to (ii) if it does not receive an association offer from access controller;
    (iv) if an association message is received from access controller, then transmitting an authentication request to access controller;
    (v) waiting until authentication response is received from access controller and returning to (ii) 'if it does not receive an authentication response;

(vi) if authentication is successful then storing radio unit session data for the first radio unit and assigning the first radio unit a session ID.

13. A method for performing mobile unit traffic segmentation in respect of a plurality of mobile units within a wireless network in order to associate each mobile unit with virtual networking services (VNS), said network including an access controller, a first radio unit and a plurality of back-end networks, said method comprising the steps of:
   (a) initiating the connection of a mobile unit to the network by transmitting communication data between the mobile unit and the first radio unit;
   (b) transmitting said communication data from said first radio unit to said access controller during the connection of the mobile unit;
   (c) discovering a plurality of individual configurable VNS factors for the mobile unit communication session based on said communication data;
   (d) associating the mobile unit with virtual networking services based on said individual configurable VNS factors;
   (e) completing the connection of a mobile unit to the network on the basis of the characteristics defined by the assigned virtual networking services, and
   (f) restricting access by the mobile unit to one of said plurality of back-end networks through an Egress Interface/Virtual Router VNS parameter on basis of a USER ID VNS factor associated with the mobile unit.

14. The method of claim 13, wherein said first radio unit is adapted to encapsulate said communication data for communication to said access controller.

15. The method of claim 13, wherein said VNS factors are selected from the group consisting of SSID, RU MAC ADDRESS, MU MAC ADDRESS, SECURITY MECHANISM, USER ID.

16. The method of claim 13, wherein said virtual network service is defined by VNS parameters selected from the group consisting of: Authentication Mechanism, Accounting Mechanism, IP Address Pools, Egress Interface/Virtual Router, Quality of Service (QoS), Packet Filters, and Walled Garden.

17. The method of claim 13, wherein prior to step (a), access controller and first radio unit have acquired initial VNS factors.

18. The method of claim 17, wherein said VNS factors are selected from the group consisting of SSID, RU MAC ADDRESS, MU MAC ADDRESS, SECURITY MECHANISM, USER ID.

19. The method of claim 13, wherein requests and responses are exchanged amongst said mobile unit, said radio unit and said access controller during the connection of said mobile unit at a plurality of time events.

20. The method of claim 19, wherein at a first time event, the VNS factors SSID, RU MAC ADDRESS and MU MAC ADDRESS are discovered.

21. The method of claim 13, wherein at a second time event, the VNS factor SECURITY MECHANISM is discovered.

22. The method of claim 13, wherein at a third and fourth time event, the VNS factor USER ID is discovered.

23. The method of claim 13, wherein said network further comprises a second radio unit, said method further comprising the step of re-associating the mobile unit to the network when the mobile unit passes out of range of said first radio unit into range of said second radio unit and wherein the new VNS factors of RU MAC ADDRESS and MU MAC ADDRESS are re-obtained for this purpose.

24. The method of claim 13, wherein the access controller is further adapted to:
   (v) manage the mobile unit communication session over time in accordance with the VNS;
   (vi) manage termination of association of the mobile unit based on segment specific conditions; and
   (vii) roll-up, accounting and reporting of segment specific information.

25. The method of claim 13, wherein the first radio unit is adapted to perform the following steps in order to become registered within wireless network:
   (i) initializing the hardware within first radio unit;
   (ii) transmitting a discovery message over the wireless network in order to locate the access controller;
   (iii) waiting to receive an offer message from the access controller and returning to (ii) if it does not receive an association offer from access controller;
   (iv) if an association message is received from access controller, then transmitting an authentication request to access controller;
   (v) waiting until authentication response is received from access controller and returning to (ii) if it does not receive an authentication response;
   (vi) if authentication is successful then storing radio unit session data for the first radio unit and assigning the first radio unit a session ID.

* * * * *